United States Patent
Abe et al.

(10) Patent No.: US 7,857,347 B2
(45) Date of Patent: Dec. 28, 2010

(54) AIRBAG AND AIRBAG APPARATUS

(75) Inventors: Kazuhiro Abe, Tokyo (JP); Masayoshi Kumagai, Tokyo (JP)

(73) Assignee: Takata Corporation, Tokyo (JP)

( * ) Notice: Subject to any disclaimer, the term of this patent is extended or adjusted under 35 U.S.C. 154(b) by 91 days.

(21) Appl. No.: 12/292,979

(22) Filed: Dec. 2, 2008

(65) Prior Publication Data

US 2009/0212538 A1 Aug. 27, 2009

(30) Foreign Application Priority Data

Feb. 25, 2008 (JP) .............................. 2008-043107

(51) Int. Cl.
*B60R 21/276* (2006.01)

(52) U.S. Cl. .................... 280/743.2; 280/739; 280/729

(58) Field of Classification Search ............... 280/743.2, 280/739, 729
See application file for complete search history.

(56) References Cited

U.S. PATENT DOCUMENTS

| | | | | |
|---|---|---|---|---|
| 5,240,283 | A * | 8/1993 | Kishi et al. | 280/729 |
| 5,906,391 | A * | 5/1999 | Weir et al. | 280/729 |
| 6,059,312 | A * | 5/2000 | Staub et al. | 280/729 |
| 6,419,267 | B1 * | 7/2002 | Hashimoto et al. | 280/743.1 |
| 6,773,027 | B2 * | 8/2004 | Bohn et al. | 280/729 |
| 6,832,778 | B2 | 12/2004 | Pinsenschaum et al. | |
| 7,261,319 | B2 * | 8/2007 | DePottey et al. | 280/739 |
| 7,328,915 | B2 | 2/2008 | Smith et al. | |
| 7,347,450 | B2 | 3/2008 | Williams et al. | |
| 7,441,802 | B2 * | 10/2008 | Yamaji et al. | 280/739 |
| 7,543,849 | B2 * | 6/2009 | Bradburn | 280/739 |
| 7,543,850 | B2 * | 6/2009 | Bachraty et al. | 280/743.1 |
| 7,607,690 | B2 * | 10/2009 | Abe et al. | 280/739 |
| 7,708,305 | B2 * | 5/2010 | Ishiguro et al. | 280/729 |
| 2003/0209895 | A1 * | 11/2003 | Gu | 280/739 |
| 2005/0248137 | A1 | 11/2005 | Delventhal et al. | |
| 2006/0151979 | A1 | 7/2006 | DePottey et al. | |
| 2007/0013177 | A1 * | 1/2007 | Abe | 280/739 |
| 2007/0045997 | A1 * | 3/2007 | Abe et al. | 280/729 |
| 2007/0145729 | A1 * | 6/2007 | Ishiguro et al. | 280/739 |
| 2007/0170710 | A1 * | 7/2007 | Bouquier | 280/739 |
| 2009/0020991 | A1 * | 1/2009 | Abe et al. | 280/739 |

FOREIGN PATENT DOCUMENTS

| | | |
|---|---|---|
| FR | 2 757 465 | 6/1998 |
| JP | H06-127330 | 5/1994 |
| JP | 2005-199987 | 7/2005 |

* cited by examiner

*Primary Examiner*—Paul N Dickson
*Assistant Examiner*—Drew Brown
(74) *Attorney, Agent, or Firm*—Manabu Kanesaka (57) ABSTRACT

An airbag device includes an outer shell forming an airbag and having a vent hole, a restriction member for restricting gas flow through the vent hole, a first chamber having the vent hole, a second chamber, the inner panel partitioning the airbag into the first and second chambers and having a communication portion, and a tether member for connecting the restriction member and the inner panel. Gas is introduced into the first chamber and then into the second chamber. When the first chamber is filled with gas and the inner panel is tensioned, the tension exceeding a predetermined value is applied to the restriction member so that the vent hole is substantially closed. When the first chamber is not filled with gas and the inner panel loosens, the tension applied to the restriction member does not reach the predetermined value so that the vent hole is opened.

15 Claims, 9 Drawing Sheets

AIRBAG AND AIRBAG APPARATUS

BACKGROUND OF THE INVENTION AND RELATED ART STATEMENT

The present invention relates to an airbag which is structured to restrict gas flow from the airbag through a vent hole. Further, the present invention relates to an airbag apparatus comprising the airbag.

It is well known to form a vent hole in an airbag to release gas from the inside of an inflated airbag, whereby the vehicle occupant is softly received by the airbag.

Japanese Unexamined Patent Application Publication No. 2005-199987 (Patent Document 1) discloses an airbag in which a vent hole is covered by a lid member. In this publication, a proximal end portion, near an inflator (the center of the airbag) in relation to the vent hole, of the lid member is unreleasably connected to the airbag. In addition, a distal end portion, on the other side of the vent hole from the inflator, of the lid member is caught at the periphery of the airbag between a front panel (occupant side surface) and a rear panel (non-occupant side surface) of the airbag and is releasably sewn together by a tear seam. The tear seam is formed by a sewing yarn which is designed to break when the inner pressure of the airbag exceeds a predetermined value.

According to the airbag of the publication, at an initial stage of inflation of the airbag with gas from the inflator, the connection of the front panel and the rear panel of the airbag and the lid member by the tear seam is not released so that the lid member overlaps with the vent hole. Therefore, the gas flow through the vent hole is restricted, thereby achieving rapid inflation of the airbag.

When the inner pressure of the airbag then reaches the predetermined value, the tear seam breaks so that the front panel and the rear panel of the airbag are separated and the lid member is released from the front panel and the rear panel. Because of the inner gas pressure of the airbag, the lid member is pushed out of the airbag through the vent hole so that the vent hole is opened. Therefore, when the vehicle occupant collides with the inflated airbag, the gas flows from the inside of the airbag to the outside of the airbag through the vent hole. As a result, the vehicle occupant is softly received by the airbag.

According to the airbag disclosed in the Patent Document 1, the vent hole can be opened only by break of the tear seam.

A threshold value of strength for the tear seam to break strongly depends on temperature and is thus affected by heat of gas spouted from the inflator. According to the location, the output, and the like of the inflator, the timing of the break of the tear seam tends to vary.

It is an object of the present invention to provide an airbag which does not use a tear seam, while the airbag is still capable of maintaining a vent hole in the closed or slightly opened state at an early stage of inflation of the airbag and is also capable of opening or largely opening the vent hole when gas generation of the inflator is decreased or ended after the early stage and also provide an airbag apparatus comprising the airbag.

Further objects and advantages of the invention will be apparent from the following description of the invention.

SUMMARY OF THE INVENTION

According to a first aspect of the invention, an airbag is inflated with gas from an inflator and comprises a vent hole, and a restriction member for restricting gas flow through the vent hole, wherein said restriction member maintains the vent hole in the closed or slightly opened state when tension exceeding a predetermined value is applied, and opens or largely opens the vent hole when the tension is equal to or lower than the predetermined value. The airbag further comprises an inner panel which partitions the inside of the airbag into a first chamber on the non-occupant side and a second chamber on the occupant side, wherein said vent hole is provided in said first chamber. The peripheral edge of said inner panel is connected to a side peripheral surface of said airbag. Said inner panel is provided with a communication portion for allowing communication between the first chamber and the second chamber.

As the inflator starts its operation, gas is first introduced into the first chamber and is then introduced into the second chamber from the first chamber through the communication portion. A tether member is provided for joining said restriction member and the inner panel. When the first chamber is filled with gas and the inner panel is tensioned, tension exceeding the predetermined value is applied to said restriction member via the tether member so that said vent hole is closed or slightly opened, and when the first chamber is not filled with gas and the inner panel loosens, the tension applied to said restriction member does not reach the predetermined value so that said vent hole is opened or largely opened.

According to a second aspect of the invention, at an early stage of inflation of the airbag according to the first aspect of the invention where the inner pressure of said first chamber is higher than the inner pressure of said second chamber, the restriction member is overlapped on the vent hole by the tension applied to the restriction member via said tether member so as to maintain the vent hole in the closed or slightly opened state. Subsequently, as the gas generation of the inflator is decreased or ended, the inner panel loosens and the tension becomes equal to or lower than the predetermined value so as to open or largely open the vent hole.

As to a third aspect of the invention, when an occupant in the vicinity of the airbag according to the first aspect collides with the airbag in a state that said inner panel is loose before the first chamber is filled with gas, the tension applied to said restriction member does not reach the predetermined value so that the vent hole is opened or largely opened.

As to a fourth aspect of the invention, said restriction member is disposed on the outer surface of the airbag according to any one of the first to the third aspects of the invention and opens or largely opens the vent hole by separating from the vent hole, wherein said tether member is disposed to extend through a through hole formed in the airbag.

As to a fifth aspect of the invention, said restriction member is disposed on the inner surface of the airbag according to any one of the first to the third aspects and opens or largely opens the vent hole by coming out of the airbag through said vent hole.

As to a sixth aspect of the invention, said tether member in the airbag according to any one of the first to the fifth aspects is connected to said inner panel.

With respect to a seventh aspect of the invention, a tether is provided to join the non-occupant-side surface of said airbag according to any one of the first to the fifth aspects and said inner panel, and said tether member is connected to a midway portion in the longitudinal direction of said tether.

With respect to an eighth aspect of the invention, said restriction member has a sheet-like shape in which one end portion across said vent hole is connected to said airbag according to any one of the first to the seventh aspects and the other end across said vent hole is connected to said tether member.

An airbag according to a ninth aspect of the invention has an inner panel which partitions the inside of the airbag into a first chamber on the non-occupant side and a second chamber on the occupant side, wherein the peripheral edge of said inner panel is connected to a side peripheral surface of the airbag. The inner panel is provided with a communication portion for allowing the communication between the first chamber and the second chamber. When the inflator starts its operation, gas is first introduced into the first chamber and is then introduced into the second chamber from the first chamber through the communication portion.

The airbag comprises a vent portion which includes a bulging portion, which bulges outwards from the first chamber, and a vent hole formed in the bulging portion, wherein a tether member extends through a through hole formed in said airbag to join said bulging portion and the inner panel, and wherein when the first chamber is filled with gas and the inner panel is tensioned, tension exceeding the predetermined value is applied to said bulging portion via the tether member so that said bulging portion is folded by squash fold so as to maintain said vent portion in the closed or slightly opened state. Also, when the first chamber is not filled with gas and the inner panel loosens, the tension applied to said bulging portion does not reach the predetermined value so that said bulging portion stands so as to open or largely open said vent portion.

With respect to a tenth aspect of the invention, when said first chamber of the airbag according to the ninth aspect of the invention is filled with gas and tension exceeding said predetermined value is applied to said bulging portion, the bulging portion is folded by squash fold such that the bulging portion is overlaid on an outer surface of the airbag near the bulging portion, and said vent hole is formed in a surface of the bulging portion so as to be overlaid on the outer surface of the airbag.

With respect to an eleventh aspect of the invention, wherein said tether member in the airbag according to the ninth or tenth aspect is connected to said inner panel.

With respect to a twelfth aspect of the invention, a tether is provided to join the non-occupant-side surface of said airbag according to the ninth or tenth aspect and said inner panel, and said tether member is connected to a midway portion in the longitudinal direction of said tether.

With respect to a thirteenth aspect of the invention, the volume of said first chamber in the airbag according to any one of the first to twelfth aspects is in a range of from 30 to 45 liters.

With respect to a fourteenth aspect of the invention, the diameter of the airbag according to any one of the first to thirteenth aspects when being inflated is in a range of from 630 to 700 mm, and the diameter of the first chamber when being inflated is in a range of from 550 to 600 mm.

With respect to a fifteenth aspect of the invention, an airbag comprises an airbag according to any one of the first through fourteenth aspects and an inflator for inflating said airbag.

In an airbag of any one of the first through the eighth aspects and an airbag apparatus comprising the airbag, at an early stage of inflation of the airbag in which the inner pressure of the first chamber is higher than the inner pressure of the second chamber, the first chamber is filled with gas and the inner panel is tensioned so that tension exceeding the predetermined value is applied to the restriction member via the tether member, thereby maintaining the vent hole in the closed or slightly opened state. Since the gas flow through the vent hole is thus restricted, the airbag is promptly inflated.

Subsequently, as the gas generation of the inflator is decreased or ended, the first chamber and the second chamber become nearly the same inner pressure so that the inner panel loosens and the tension applied to the restriction member is thus reduced. Accordingly, when an occupant collides with the inflated airbag, the vent hole is opened or largely opened so that gas flows out from the inside of the airbag through the vent hole. As a result, the occupant is softly received by the airbag.

When the inflator is actuated in a state that the occupant is out-of-position in the vicinity of the airbag apparatus and the occupant collides with the airbag before the first chamber is filled with gas, the inner panel does not reach the tensioned state so that the tension of the restriction member does not reach the predetermined value. Therefore, the vent hole is opened or largely opened so that gas inside the airbag flows out through the vent hole.

The airbag and the airbag apparatus do not use a tear seam, while the airbag and the airbag apparatus are still capable of maintaining a vent hole in the closed or slightly opened state at an early stage of inflation of the airbag and are also capable of opening or largely opening the vent hole when gas generation of the inflator is decreased or ended after the early stage, thereby preventing timing of opening the vent hole from being affected by the influence of heat of gas spouted from the inflator.

In one embodiment of the present invention, the restriction member is disposed on the outer surface of the airbag and the tether member extends through the through hole formed in the airbag. In this case, when the tension applied to the tether member is larger than the predetermined value, the restriction member is overlaid on the vent hole from the outside of the airbag, thereby maintaining the vent hole in the closed or slightly opened state. When the tension applied to the tether member becomes equal to or smaller than the predetermined value, the restriction member is pushed out by gas inside the airbag so as to separate from the vent hole, thereby opening or largely opening the vent hole.

In another embodiment of the present invention, the restriction member is disposed on the inner surface of the airbag. When the tension applied to the tether member is larger than the predetermined value, the restriction member withstands the inner pressure of the airbag to continuously cover the vent hole, thereby maintaining the vent hole in the closed or slightly opened state. When the tension applied to the tether member becomes equal to or smaller than the predetermined value, the restriction member is pushed by the gas pressure inside the airbag so as to come out of the airbag through the vent hole, thereby opening or largely opening the vent hole.

In an airbag according to any one of the ninth through twelfth aspects and an airbag apparatus comprising the airbag, at an early stage of inflation of the airbag in which the inner pressure of the first chamber is higher than the second chamber, the first chamber is filled with gas and the inner panel is tensioned so that the bulging portion is strongly pulled by the tether member and is thus folded by squash fold, thereby maintaining the vent hole in the closed or slightly opened state. Accordingly, gas flow through the vent hole is prevented, thereby promptly inflating the airbag.

After that, as the gas generation of the inflator is decreased or ended, the first chamber and the second chamber become to have nearly the same inner pressure so that the inner panel loosens. Accordingly, the bulging portion stands upward relative to the airbag, thereby opening or largely opening the vent portion. When the occupant collides with the inflated airbag, gas flows out from inside of the airbag through the vent hole so that the occupant is softly received by the airbag.

In the present invention, according to the sixth or eleventh aspect, the tether member may be connected directly to the inner panel. In this case, easier structure is achieved.

In the present invention, according to the seventh or twelfth aspect, a tether may be provided to join the non-occupant-side surface of the airbag and the inner panel. By the tether, the configuration of the inner panel when filled with gas can be restricted. In this case, the tether member may be connected to a midway portion in the longitudinal direction of the tether.

If the vent hole is formed in a surface of the bulging portion which is folded by squash fold so as to be overlaid on the outer surface of the airbag according to the tenth aspect, gas flow through the vent hole is sufficiently restricted in the state that the bulging portion is folded by squash fold.

DETAILED DESCRIPTION OF THE PREFERRED EMBODIMENTS

Hereinafter, embodiments of the present invention will be described with reference to the attached drawings.

Figure 1:
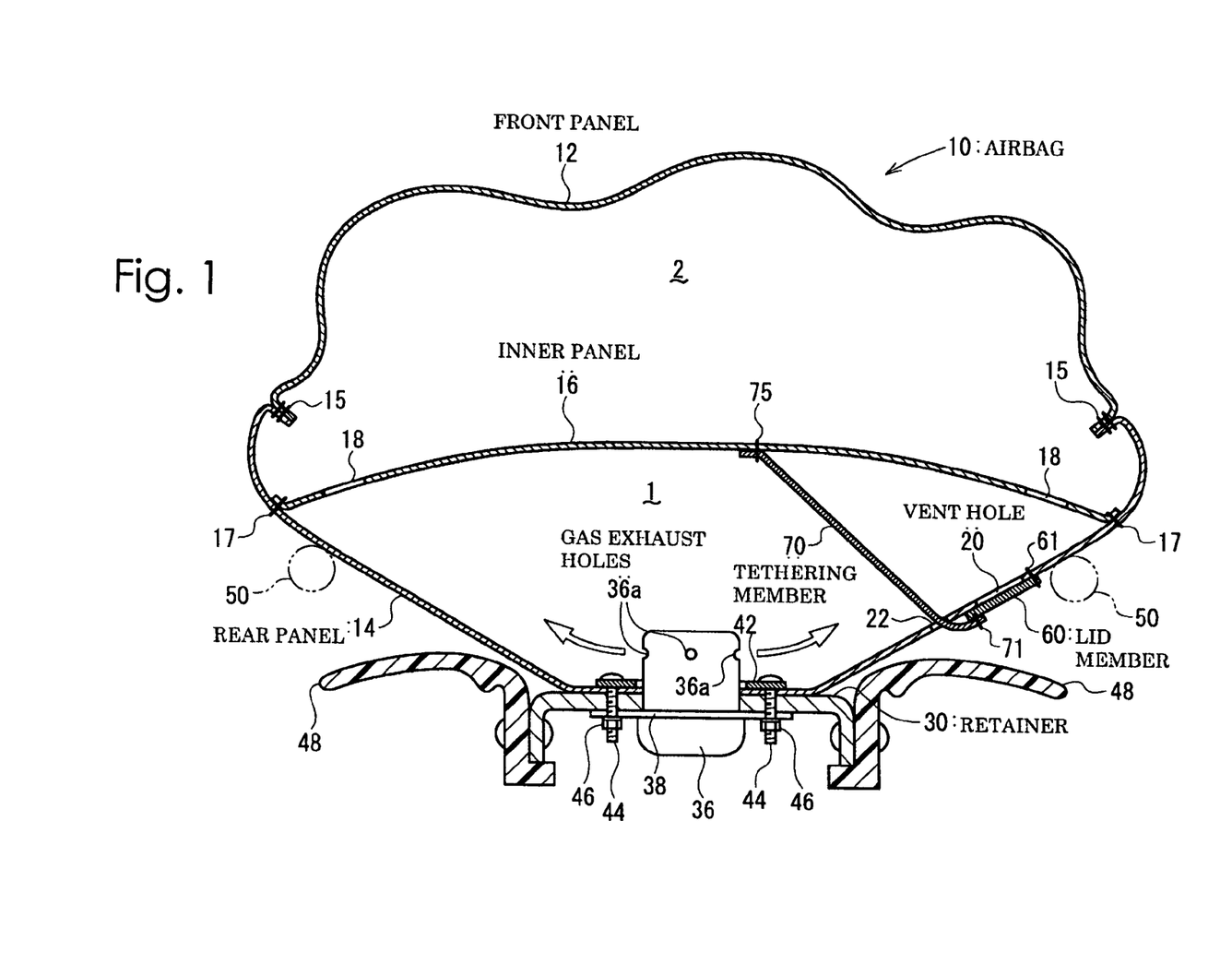
FIG. 1 is a sectional view of an airbag and an airbag apparatus according to an embodiment, showing an early stage of inflation of the airbag.
Figure 2:
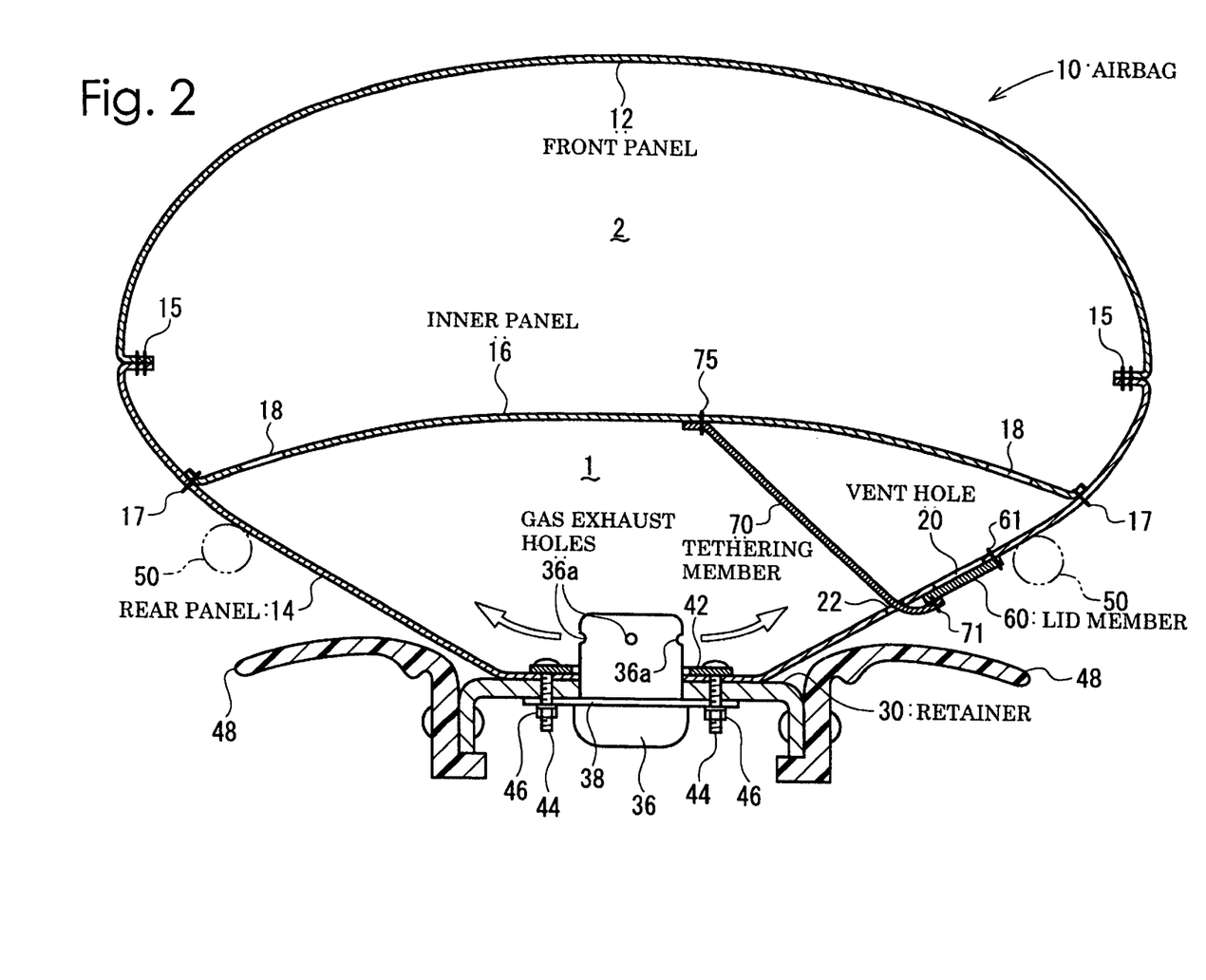
FIG. 2 is a sectional view of the airbag and the airbag apparatus of FIG. 1, showing a stage just before gas generation of an inflator is ended.
Figure 3:
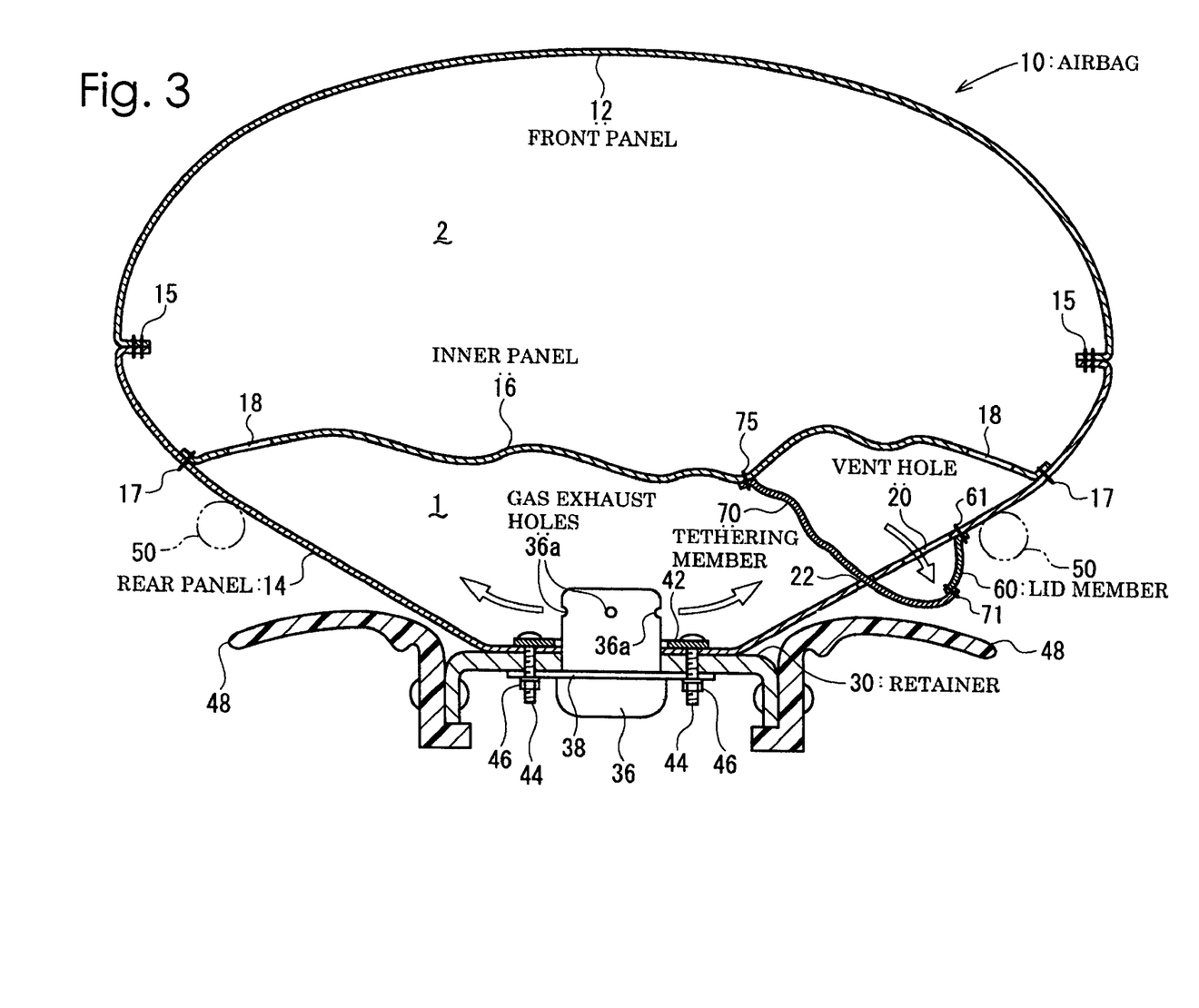
FIG. 3 is a sectional view of the airbag and the airbag apparatus of FIG. 1, showing a stage when the vent hole is opened.
Figure 4:
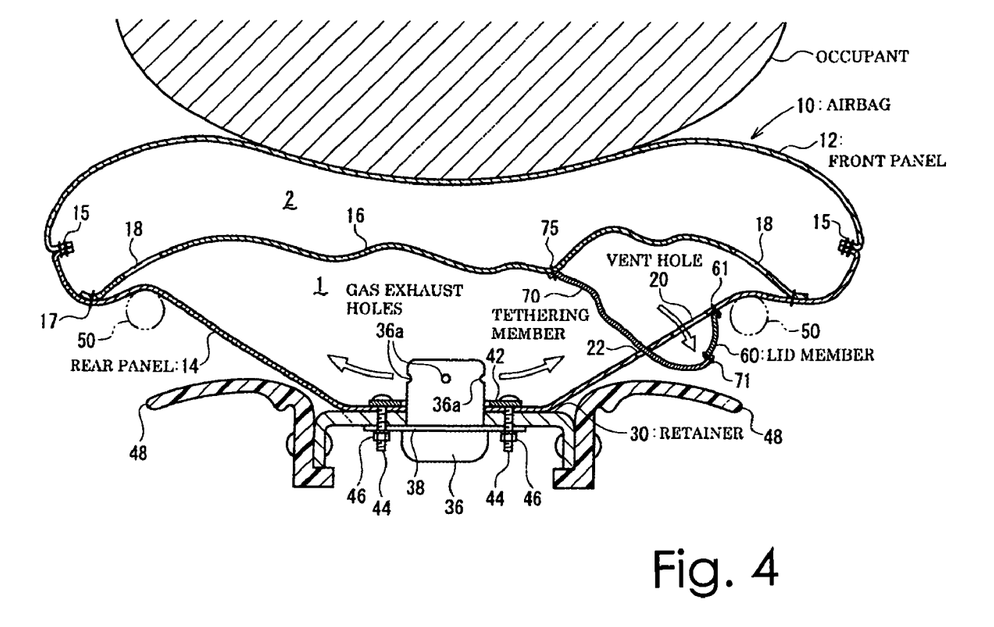
FIG. 4 is a sectional view of the airbag and the airbag apparatus of FIG. 1, showing a state when an out-of-position occupant collides with the airbag.

FIGS. 1 through 4 are sectional views of an airbag and an airbag apparatus comprising the same according to an embodiment corresponding to the first aspect through sixth aspect and the eighth aspect of the invention, showing respective states during the inflation. FIG. 1 shows an early stage of the inflation in which the inner pressure of a first chamber is higher than the inner pressure of a second chamber. FIG. 2 shows a stage just before gas generation of an inflator is ended, and FIG. 3 shows a stage when the vent hole is opened. In addition, FIG. 4 shows a state when an out-of-position occupant collides with the airbag during inflation.

In this embodiment, the airbag 10 is a driver-side airbag which is inflated and deployed from a steering wheel 50 toward an occupant.

The airbag 10 comprises a front panel 12 composing an occupant-side surface, a rear panel 14 composing a surface opposite to the occupant-side surface (hereinafter, referred to "non-occupant-side surface") when the airbag 10 is inflated, an inner panel 16 disposed inside of the airbag 10, a vent hole 20 which can be closed and opened by a lid member 60 as a restriction member, and a tether member 70 having a band-like shape which connects the lid member 60 to the inner panel 16. In this embodiment, the lid member 60 covers the vent hole 20 from the outside of the airbag 10.

The front panel 12, the rear panel 14, and the inner panel 16 are circular woven fabrics, respectively. The front panel 12 and the rear panel 14 have substantially the same diameter and their peripheries are sewn together by seam 15 so as to make an envelope shape. The seam 15 is provided circularly in an annular shape along the outer periphery of the front panel 12 and the rear panel 14. The seam 15 is formed with sewing yarns, but not limited thereto.

The inner panel 16 has a diameter smaller than that of the rear panel 14. The inner panel 16 is arranged coaxially with the rear panel 14 and is sewn along its outer periphery to the rear panel 14 by seam 17. The inner panel 16 partitions the inside of the airbag 10 into a first chamber 1 on the non-occupant side and a second chamber 2 on the occupant side. The inner panel 16 is provided with a plurality of communication holes 18 for allowing communication between the first chamber 1 and the second chamber 2. It is preferable that the number of communication holes 18 is two or more and the communication holes 18 are formed near the periphery of the inner panel 16 to have space therebetween in the circumferential direction.

The rear panel 14 has an inflator-receiving opening (without numeral) formed at its center. Formed around the inflator-receiving opening are bolt through holes (without numeral) through which stud bolts 44 of a retention ring 42 as will be described later are inserted.

In this embodiment, as shown in FIG. 2 and FIG. 3, the vent hole 20 is located in a region between the steering wheel 50 and the center of the rear panel 14 when the airbag 10 is inflated.

The rear panel 14 has a through hole 22 which is formed adjacent to the vent hole 20 and through which the tether member 70 is inserted. In this embodiment, the through hole 22 is located between the vent hole 20 and the center of the rear panel 14. The locations of the vent hole 20 and the through hole 22 are not limited thereto.

In this embodiment, the size of the through hole 22 is smaller than that of the vent hole 20. The vent hole 20 and the through hole 22 may have slit-like shape.

In this embodiment, the aforementioned lid member 60 is made of a substantially fan-shaped fabric cloth. The lid member 60 is overlaid on the vent hole 20 from the outside of the airbag 10 such that an arc edge portion thereof is located toward the outer periphery of the rear panel 14 and a convex portion facing the arc edge portion is located toward the center of the rear panel 14. The lid member 60 is sewn to the rear panel 14 along its arc edge portion on the side of the outer periphery of the rear panel 14 by seam 61. That is, the lid member 60 has a fixed end on the side of the outer periphery of the rear panel 14 and has a free end on the side of the center of the rear panel 14.

Connected to the convex portion, on the side of the center of the rear panel 14, of the lid member 60 is an end of the tether member 70. In this embodiment, the lid member 60 and the tether member 70 are separately formed and the end of the tether member 70 is sewn to the convex portion, on the side of the center of the rear panel 14, of the lid member 60 by the seam 71. However, the lid member 60 and the tether member 70 may be uniformly made of a common fabric cloth.

The other end of the tether member 70 is drawn into the airbag 10 through the through hole 22 and is sewn to a portion near the center of the inner panel 16 by seam 75.

The tether member 70 has such a length that, in the early stage of inflation of the airbag 10 before the gas generation from the inflator 36 is decreased to a predetermined level or less or is ended, the tether member 70 is tensioned (strained) between the inner panel 16 and the lid member 60 according to the movement of the side periphery of the airbag 10 away from the inner panel 16 so as to prevent the lid member 60 from separating from the vent hole 20.

A retainer 30 for mounting the airbag 10 has an inflator mounting opening (without numeral) formed at the center thereof and bolt through holes (without numeral) formed around the opening.

The inflator 36 is substantially cylindrical in shape and has gas exhaust holes 36a formed in outer side face of a distal end portion in the axial direction of the cylinder. The inflator 36 is structured so as to spout gas through gas exhaust holes 36a in radial directions. A flange 38 for securing the inflator is formed to project from the side periphery of a midway portion (on the rear end side with regard to the gas exhaust holes 36a) in the axial direction of the cylinder of the inflator 36. The flange 38 is provided with bolt through holes (without numeral) formed therein. The distal end portion of the inflator 36 is fitted into the inflator mounting opening of the retainer 30.

For mounting the airbag 10 to the retainer 30, the peripheral portion of the inflator mounting opening of the retainer 30 is superposed on the peripheral portion of the inflator-receiving opening of the rear panel 14. Then, stud bolts 44 of the retention ring 42 are inserted into the respective bolt through holes of the rear panel 14, the retainer 30, and the flange 38 of the inflator 36, and nuts 46 are screwed onto distal ends of the stud bolts 44, thereby fixing the rear panel 14 and the inflator 36 to the retainer 30.

After that, the airbag 10 is folded and a module cover 48 is attached to the retainer 30 to cover the airbag 10 in the folded state, thereby composing the airbag apparatus. The airbag 10 may be previously folded prior to the fixing of the airbag 10 to the retainer 30.

The airbag 10 is folded in a state that the lid member 60 is overlaid on the vent hole 20 even though this state is not clearly shown in the drawings. By folding the airbag 10 in this manner, the vent hole 20 can be closed by the lid member 60 from the start of inflation of the airbag 10.

The airbag apparatus is mounted to a steering wheel 50 of a vehicle.

In the event of a collision of a vehicle in which the airbag apparatus having the aforementioned structure is mounted, the inflator 36 is actuated to spout gas. The airbag 10 is inflated by the gas to push open a module cover 48 and is thus deployed into the vehicle cabin.

During the deployment, as shown in FIG. 1, the first chamber 1 is first inflated with gas from the inflator 36. Then, the gas flows from the first chamber 1 into the second chamber 2 through the communication holes 18 so that the second chamber 2 is inflated.

In this embodiment, the lid member 60 is overlaid on the vent hole 20 at the start of inflation of the airbag 10. Therefore, the inside of the airbag 10 is quickly filled with gas.

At the early stage of inflation of the airbag 10 in which the inner pressure of the first chamber 1 is higher than the inner pressure of the airbag 10, that is, before the gas generation from the inflator 36 is decreased to the predetermined level or less or is ended, the first chamber 1 is filled with gas so that the inner panel 16 is tensioned as shown in FIG. 2.

In this state, since the tension of the inner panel 16 is high, the configuration of the inner panel 16 absolutely or substantially stays constant even though the tether member 70 is pulled outside of the airbag 10. If the lid member 60 is about to separate from the vent hole 20 because of the inner gas pressure of the airbag 10, the lid member 60 is caught by the inner panel 16 via the tether member 70 so that the lid member 60 does not separate from the vent hole 20. Accordingly, the closed state of the vent hole 20 by the lid member 60 is maintained, thereby promptly increasing the inner pressure of the airbag 10 and thus quickly inflating and deploying the airbag 10.

Subsequently, as the gas generation of the inflator 36 is decreased to the predetermined level or less, or is ended, the first chamber 1 and the second chamber 2 which communicate with each other via the communication holes 18 become nearly the same inner pressure so that the inner panel 16 loosens. Accordingly, as shown in FIG. 3, the inner panel 16 moves toward the through hole 22 because of the tension of the tether member 70 so that the lid member 60 moves outside the airbag 10 to separate from the vent hole 20 by the gas pressure inside the airbag 10. Therefore, the vent hole 20 is opened.

When, the occupant subsequently collides with the airbag 10 which is inflated, gas flows out of the airbag 10 through the vent hole 20 so that the occupant is softly received by the airbag 10.

As mentioned above, the airbag 10 mentioned above achieves such a structure without using tear seam that the vent hole 20 is closed at the early stage of inflation of the airbag 10 and the vent hole 20 is opened when the gas generation of the inflator 36 is decreased to the predetermined level or less, or is ended after the early stage, thereby preventing timing of opening the vent hole 20 from being affected by the influence of heat of gas spouted from the inflator 36.

When the vehicle is subjected to a vehicle collision in a state that the occupant is positioned forward relative to the usual sitting position, that is, the occupant is out-of-position, the occupant may collide with the airbag 10 at a relatively early stage from the start of actuation of the inflator 36. In this case, the first chamber 1 is quickly inflated because the volume of the first chamber 1 is smaller than that of the airbag 10, and gas from the inflator 36 is directly introduced into the first chamber 1, whereby the occupant can be received by the first chamber 1 at an early stage.

Also in this case, as shown in FIG. 4, even before the gas generation of the inflator 36 is decreased to the predetermined level or less, or is ended, the inner panel 16 receiving the occupant is pressed by the occupant and is thus deformed to move backward, thereby moving the lid member 60 outside the airbag 10 to separate from the vent hole 20. Therefore, the vent hole 20 is opened to allow gas to flow out of the airbag 10 through the vent hole 20, thereby softly receiving the occupant.

In case that the diameter of the airbag 10 when inflated is approximately 630-700 mm, the diameter of the first chamber 1 when inflated, that is, the diameter of a circle formed by the seam 17 is preferably approximately 550-600 mm.

It should be noted that the shape of the airbag 10 or the inner panel 16 is not limited to a circle and may be a quadrangle such as a square and a trapezoid, or a similar shape. In addition, the shape may be a polygon such as a pentagon or a hexagon. In case of non-circular airbag or inner panel, the "diameter" used above means an average diameter.

The volume of the first chamber 1 is preferably 30-45 liters, more preferably 35-40 liters.

The airbag of the present invention is not limited to the aforementioned dimensions.

Though the lid member 60 closes the whole vent hole 20 in the aforementioned embodiment, the lid member 60 may adjust the vent hole 20 from the largely opened state to the slightly opened state. For example, even when the lid member 60 is overlaid on the vent hole 20, the vent hole 20 may partially protrude from the lid member 60 so that the deviating portion allows gas to flow out. Alternatively, the lid member 60 may be provided at a position overlaid on the vent hole 20 with a small hole which is smaller than the vent hole 20, whereby the small hole allows gas to flow out even when the vent hole 20 is closed.

Though the lid member 60 covers the vent hole 20 from the outside of the airbag in the aforementioned embodiment, the lid member 60 may cover the vent hole 20 from the inside of the airbag in the present invention.

In the present invention, the restriction member for restricting the gas flow through the vent hole 20 may have a structure other than the lid member 60 covering the vent hole 20. For example, the restriction member may be a member which is arranged around the vent hole 20 and is pulled inside the airbag to bind up the vent hole 20 so as to close the vent hole 20.

Though the other end of the tether member 70 is directly connected to the inner panel 16 in the aforementioned embodiment, a tether may be disposed within the airbag to join the inner panel and the non-occupant-side surface of the airbag so as to adjust the bulging amount of the inner panel toward the occupant when the airbag is inflated and the rear end of the tether member 70 may be connected to a midway of the tether according to the seventh aspect of the present invention. That is, the tether member may be indirectly connected to the inner panel.

Figure 5:
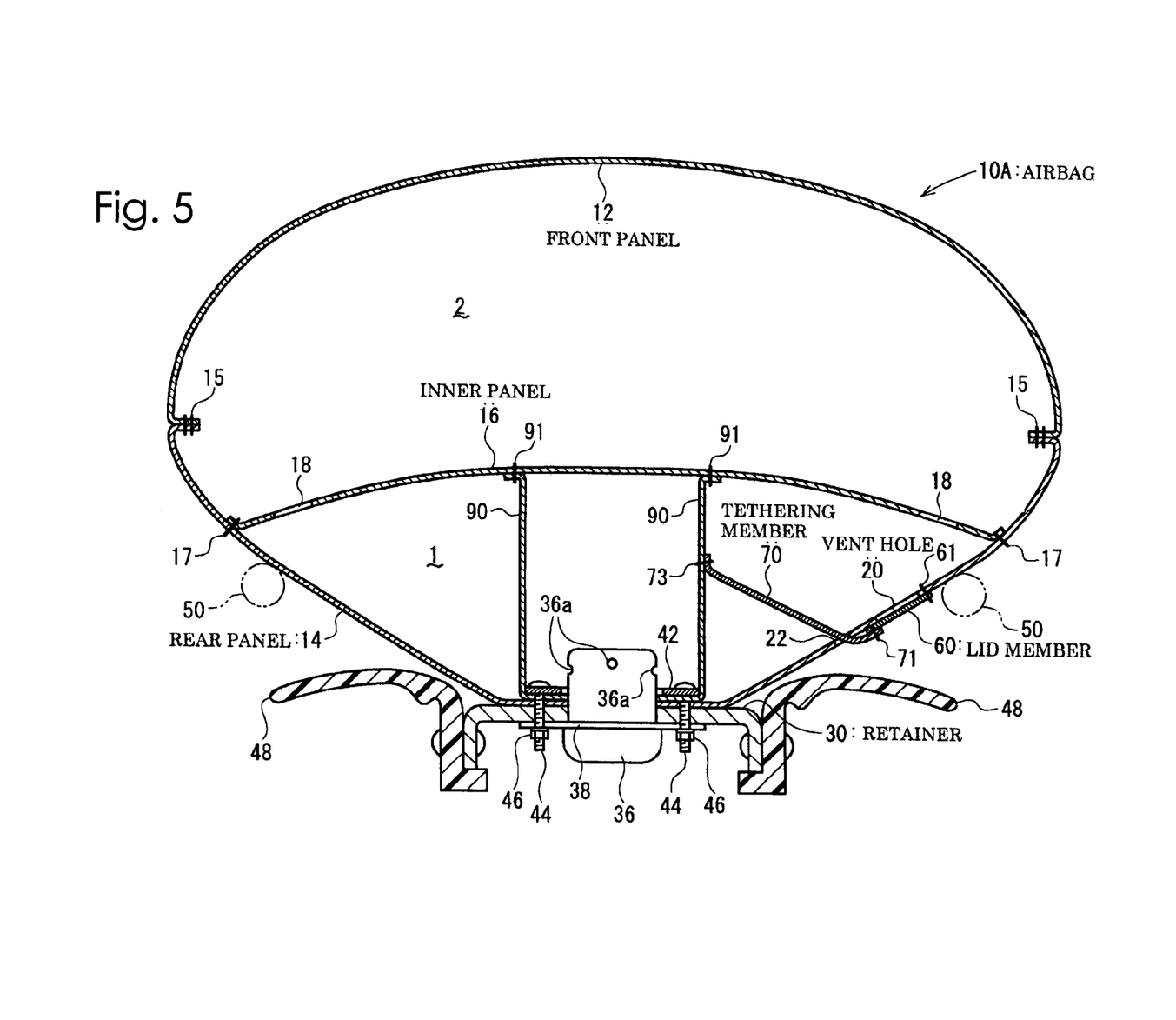
FIG. 5 is a sectional view of an airbag and an airbag apparatus according to another embodiment.

FIG. 5 is a sectional view of an example of an airbag and an airbag apparatus having the structure mentioned above.

The airbag 10A shown in FIG. 5 is provided inside thereof with tethers 90 connecting the inner panel 16 and the rear panel 14. Numeral 91 designates seam 91 sewing one end of each tether 90 to the inner panel 16. Each tether 90 is provided at the other end thereof with a bolt through hole (not shown). The other end is sandwiched between the retention ring 42 and the rear panel 14. A bolt 44 is inserted through the bolt through hole formed in the other end of the tether 90, thereby connecting the other end of the tether 90 to the retainer 30. The other end of the tether 90 may be sewn to the rear panel 14. In this embodiment, a plurality of tethers 90 are arranged to be spaced from each other in the circumferential direction of the airbag 10A. By setting the length of the tethers 90, the bulging amount of the inner panel 16 toward the occupant when the airbag 10A is inflated can be adjusted.

The other end of the tether member 70 is connected to a midway in the longitudinal direction of the tether 90 by seam 73.

The other components of the airbag 10A are the same as those of the airbag 10 shown in FIGS. 1-4 and the same numerals in FIG. 5 designate the same components as those in FIGS. 1-4.

The actions of the airbag apparatus comprising the airbag 10A having the aforementioned structure are the same as the aforementioned airbag apparatus. That is, in the event of a vehicle collision or the like, the inflator 36 is actuated to spout gas. The airbag 10A is inflated by the gas to push open the module cover 48 and is thus deployed into the vehicle cabin.

At the early stage of inflation of the airbag 10A in which the inner pressure of the first chamber 1 is higher than the inner pressure of the airbag 10A, that is, before the gas generation from the inflator 36 is decreased to the predetermined level or less, or is ended, the first chamber 1 is filled with gas so that the inner panel 16 is tensioned.

Since the lid member 60 is restrained by the inner panel 16 via the tether 90 and the tether member 70 so that the closed state of the vent hole 20 is maintained, the inner pressure of the airbag 10A is promptly increased and the airbag 10A is thus quickly inflated and deployed.

Subsequently, as the gas generation of the inflator 36 is decreased to the predetermined level or less, or is ended, the first chamber 1 and the second chamber 2 which communicate with each other via the communication holes 18 become to have nearly the same inner pressure so that the inner panel 16 loosens. Accordingly, similarly to the case shown in FIG. 3, the inner panel 16 moves toward the through hole 22 because of the tension of the tether member 70 so that the tether 90 loosens and the lid member 60 moves outside the airbag 10A to separate from the vent hole 20 by the gas pressure inside the airbag 10A. Therefore, the vent hole 20 is opened.

When the occupant subsequently collides with the airbag 10A which is inflated, gas flows out of the airbag 10A through the vent hole 20 so that the occupant is softly received by the airbag 10A.

When the vehicle is subjected to a vehicle collision in a state that the occupant is positioned in front of the usual sitting position, that is, the occupant is out-of-position, the occupant may collide with the airbag 10A at a relatively early stage from the actuation of the inflator 36. In this case, the first chamber 1 is quickly inflated because the volume of the first chamber 1 is smaller than that of the airbag 10A, and gas from the inflator 36 is directly introduced into the first chamber 1, whereby the occupant can be received by the first chamber 1 at an early stage.

Also in this case, similarly to the case shown in FIG. 4, even before the gas generation of the inflator 36 is decreased to the predetermined level or less, or is ended, the inner panel 16 receiving the occupant is pressed by the occupant and is thus deformed to move backward, thereby moving the lid member 60 outside the airbag 10A to separate from the vent hole 20. Therefore, the vent hole 20 is opened to allow gas from flowing out of the airbag 10A through the vent hole 20, thereby softly receiving the occupant.

Figure 6:
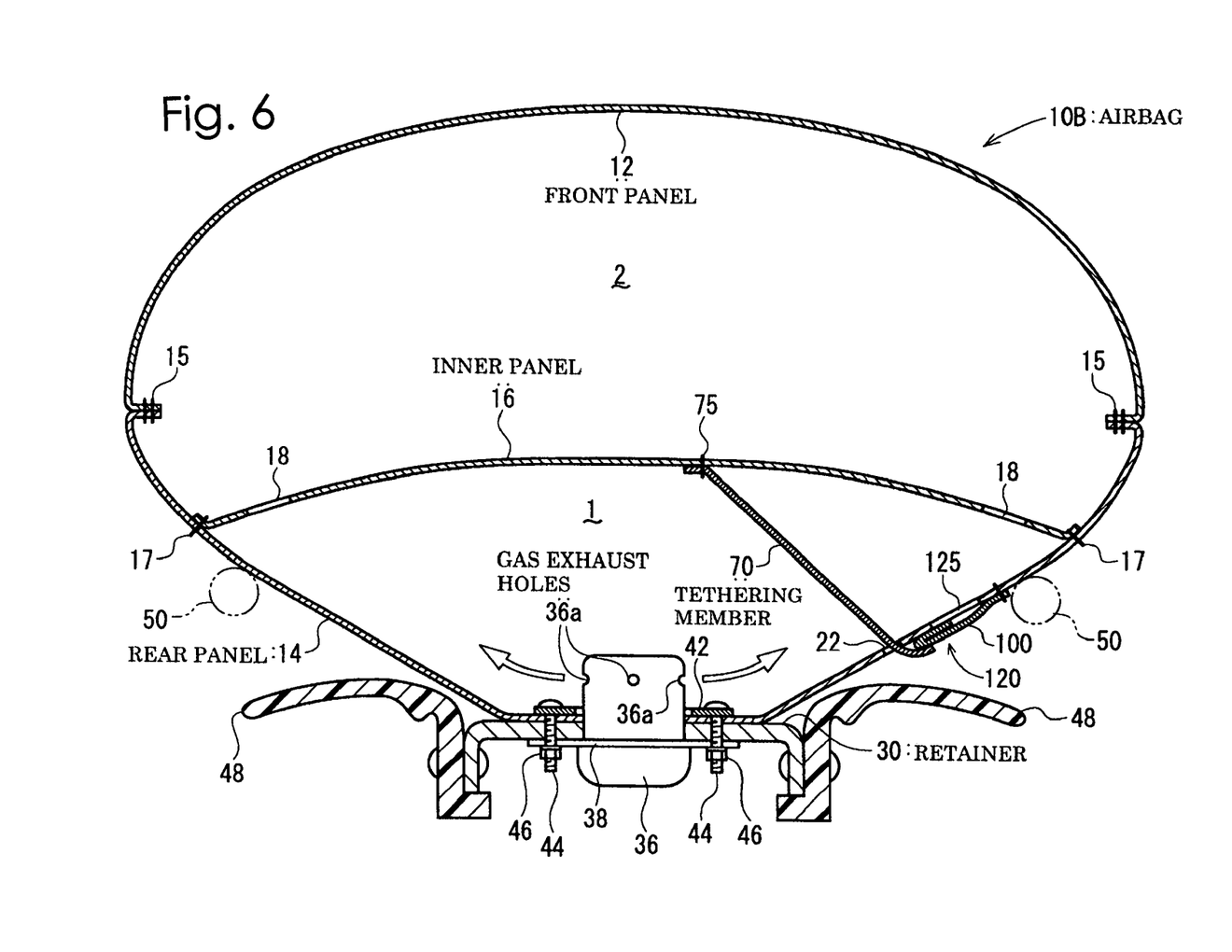
FIG. 6 is a sectional view of an airbag and an airbag apparatus according to still another embodiment, showing a stage just before gas generation of an inflator is ended.
Figure 7:
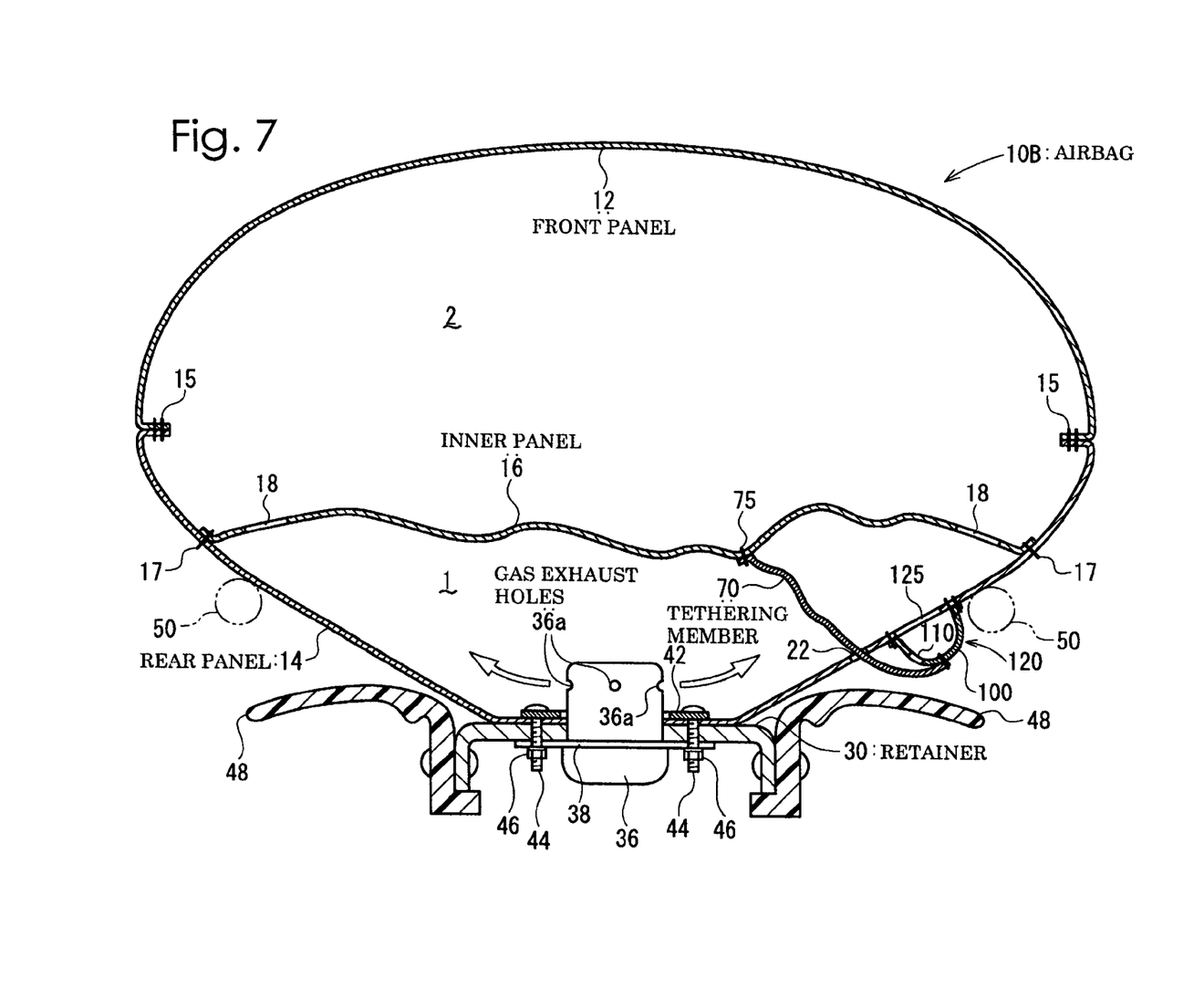
FIG. 7 is a sectional view of the airbag and the airbag apparatus of FIG. 6, showing a stage when the vent hole is opened.
Figure 8:
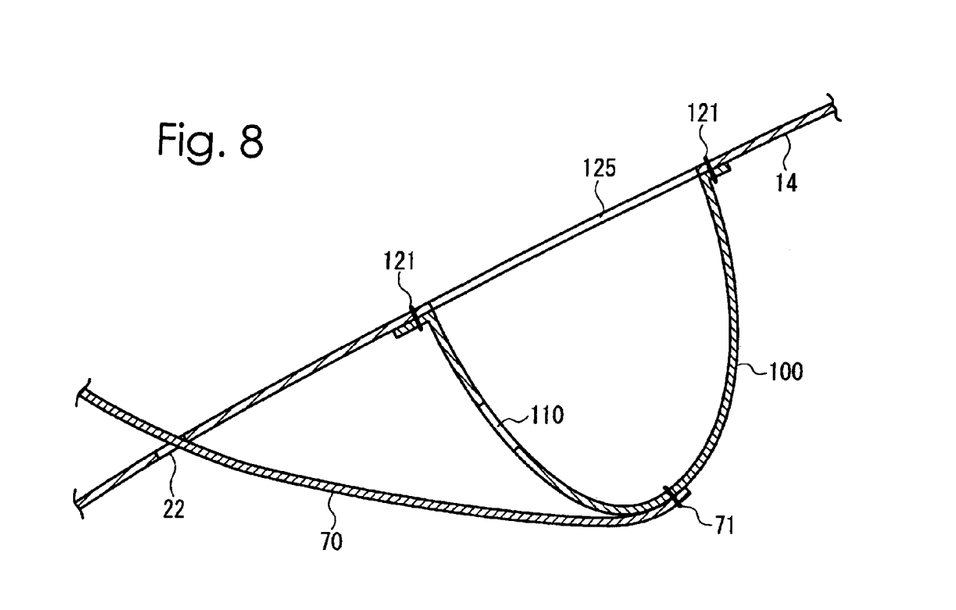
FIG. 8 is a sectional view showing a vent portion of the airbag of FIG. 7.
Figure 9:
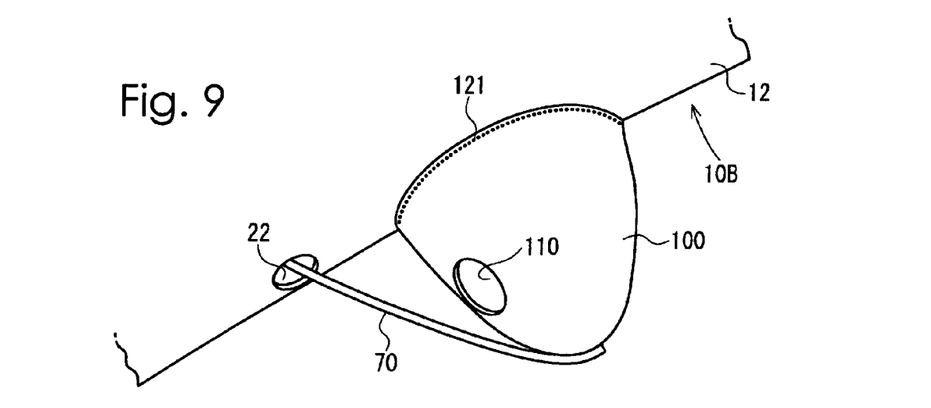
FIG. 9 is a perspective view showing the vent portion of FIG. 8.

FIGS. 6 through 9 are sectional views of an airbag and an airbag apparatus comprising the same according to an embodiment corresponding to the ninth aspect through the twelfth aspects of the invention, showing respective states during inflation. FIG. 6 shows a stage just before gas generation of an inflator is ended, and FIG. 7 shows a stage when the vent hole is opened. FIG. 8 is a sectional view of a vent portion and FIG. 9 is a perspective view of the vent portion.

An airbag 10B of this embodiment is different form the airbag 10 shown in FIGS. 1-4 by a structure around the vent hole.

In this embodiment, the airbag 10B is provided with a bulging portion 100 and a vent hole 110 is formed in the bulging portion 100. The bulging portion 100 and the vent hole 110 compose a vent portion 120.

In this embodiment, an opening 125 is formed in the airbag 10B and a proximal end portion of the bulging portion 100 is sewn to a peripheral edge of the opening 125 by seam 121. The distal end of the bulging portion 100 is closed, and the proximal end thereof is opened so that the bulging portion 100 has an envelope shape. The through hole 22 is formed at a position near the bulging portion 100. The tether member 70 is inserted through the through hole 22. The vent hole 110 is formed in a surface, facing the through hole 22, of the side periphery of the bulging portion 100. One end of the tether member 70 is connected to the distal end portion in the bulging direction of the bulging portion 100 by seam 71.

For folding the airbag 10B, the bulging portion 100 is folded by squash fold toward the through hole 22 such that the vent hole 110 is overlaid on an outer surface, near the bulging portion 100, of the airbag 10B.

The other components of the airbag 10B are the same as those of the airbag 10 shown in FIGS. 1-4 and the same numerals designate the same components as those in FIGS. 1-4.

In the event of a collision or the like of a vehicle in which an airbag apparatus comprising the airbag 10B having the structure as mentioned above is installed, the inflator 36 is actuated to spout gas. The airbag 10B is inflated by the gas to push open the module cover 48 and is thus deployed into the vehicle cabin.

During the deployment, similarly to the case shown in FIG. 1, the first chamber 1 is first inflated with gas from the inflator 36. Then, gas flows from the first chamber 1 into the second chamber 2 through the communication holes 18 so that the second chamber 2 is inflated.

In this embodiment, the bulging portion 100 is folded by the squash fold and the vent hole 110 is overlaid on the outer surface of the airbag 10B at the start of inflation of the airbag 10B. Accordingly, gas barely flows through the vent portion 120 so that the airbag 10 is promptly filled with gas.

At the early stage of inflation of the airbag 10B in which the inner pressure of the first chamber 1 is higher than the inner pressure of the airbag 10B, that is, before the gas generation from the inflator 36 is decreased to the predetermined level or less, or is ended, the first chamber 1 is filled with gas so that the inner panel 16 is tensioned as shown in FIG. 6.

In this state, the tension of the inner panel 16 is high. Therefore, even though the bulging portion 100 is about to stand upward and the tether member 70 is thus pulled outside the airbag 10B, the configuration of the inner panel 16 slightly varies or does not vary at all. That is, even though the bulging portion 100 is about to stand because of the inner gas pressure of the airbag 10B, the bulging portion 100 is restrained by the inner panel 16 via the tether member 70 and thus does not stand upward, thereby maintaining the vent portion 120 composed of the bulging portion 100 and the vent hole 110 in the closed or slightly opened state. Therefore, the inner pressure of the airbag 10B is promptly increased, and the airbag 10 is thus quickly inflated and deployed.

After that, as the gas generation of the inflator 36 is decreased to the predetermined level or less, or is ended, the first chamber 1 and the second chamber 2 which communicate with each other via the communication holes 18 become to have nearly the same inner pressure so that the inner panel 16 loosens. Accordingly, as shown in FIGS. 7 and 8, the inner panel 16 moves toward the through hole 22 because of the tension of the tether member 70 so that the bulging portion 100 stands upward. Therefore, the vent portion 120 composed of the bulging portion 100 and the vent hole 110 is opened or largely opened.

When the occupant subsequently collides with the airbag 10B which is inflated, gas flows out of the airbag 10B through the vent hole 110 so that the occupant is softly received by the airbag 10B.

When the vehicle is subjected to a vehicle collision in a state that the occupant is positioned in front of the usual sitting position, that is, the occupant is out-of-position, the occupant may collide with the airbag 10B at a relatively early stage from the actuation of the inflator 36. In this case, the first chamber 1 is quickly inflated because the volume of the first chamber 1 is smaller than that of the airbag 10B, and gas from the inflator 36 is directly introduced into the first chamber 1, whereby the occupant can be received by the first chamber 1 at an early stage.

Also in this case, similarly to the case shown in FIG. 4, even before the gas generation of the inflator 36 is decreased to the predetermined level or less, or is ended, the inner panel 16 receiving the occupant is pressed by the occupant and is thus deformed to move backward, thereby allowing the bulging portion 100 to stand. Therefore, the vent portion composed of the bulging portion 100 and the vent hole 110 is opened or largely opened to allow gas to flow out of the airbag 10B through the vent hole 110, thereby softly receiving the occupant.

Since any of the aforementioned embodiments are an example of the present invention, the present invention is not limited to the aforementioned embodiments.

Though all of the vent hole 20, the through hole 22, and the opening 125 are circular openings in any of the aforementioned embodiments, the shapes of the vent hole 20, the through hole 22, and the opening 125 are not limited thereto and may be another shape such as a square and a slit-like shape.

Figure 10:
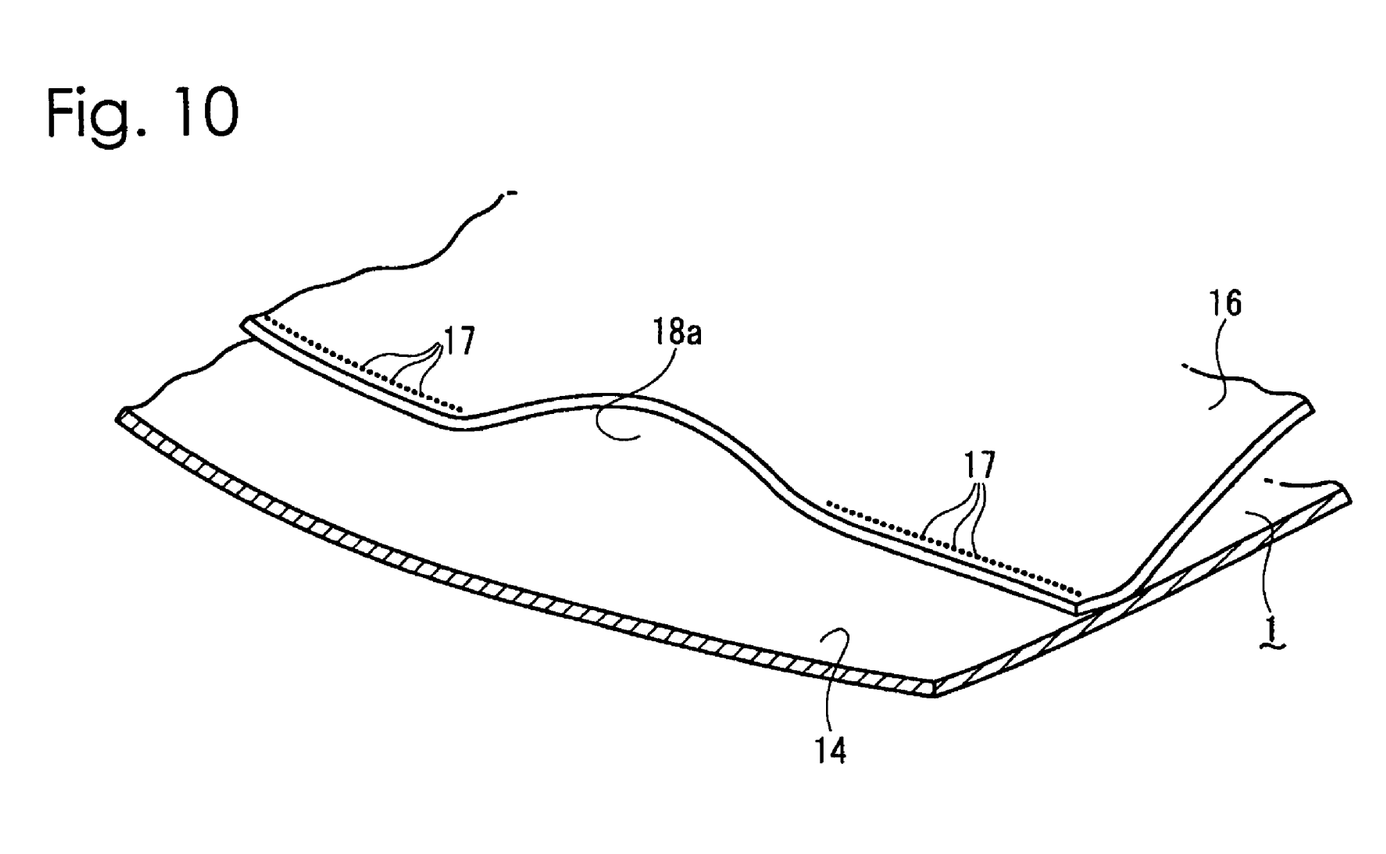
FIG. 10 is a perspective sectional view showing the periphery of an inner panel inside an airbag according to another embodiment.

Though the inner panel 16 is provided with communication holes 18 in any of the aforementioned embodiments, communication portions 18a may be formed between the inner panel 16 and the rear panel by making portions without seam 17 in the periphery of the inner panel 16 as shown in FIG. 10.

Though any of the aforementioned embodiments is an example that the present invention is applied to an airbag and an airbag apparatus to be installed for a driver's seat of a vehicle, the present invention can be applied to other various airbags and airbag apparatus, such as airbags and airbag apparatuses to be installed for a front passenger's seat and a rear seats.

The disclosure of Japanese Patent Application No. 2007-043107, filed on Feb. 25, 2008, is incorporated in the application.

While the invention has been explained with reference to the specific embodiments of the invention, the explanation is illustrative and the invention is limited only by the appended claims.

What is claimed is:

1. An airbag device to be deployed by gas supplied from an inflator for restraining an occupant, comprising:
    an outer shell forming an airbag and having a vent hole and a through hole smaller than the vent hole, said through hole being located adjacent to the vent hole;
    a restriction member for restricting gas flow through the vent hole;
    an inner panel partitioning an inside of the airbag into a first chamber located at a side opposite to the occupant and a second chamber located at a side of the occupant, and having a peripheral edge connected to a side periphery of the airbag and a communication portion for allowing communication between the first chamber and the second chamber, the vent hole being provided in the first chamber; and
    a tether member for connecting said restriction member and the inner panel, said tether member extending through the through hole and being connected to the restriction member at a location external of the outer shell, said airbag device being arranged such that:
    as the inflator starts its operation, the gas is first introduced into the first chamber and is then introduced into the second chamber through the communication portion,
    when the first chamber is filled with the gas and the inner panel is tensioned by a pressure differential between the first chamber and the second chamber, a tension exceeding a predetermined value is applied to said restriction member via the tether member so that said vent hole is substantially closed, and when the first chamber is not filled with the gas and the inner panel loosens, the tension applied to said restriction member does not reach the predetermined value so that said vent hole is substantially opened.

2. An airbag device according to claim 1, wherein the airbag device is further arranged such that at an early stage of inflation of the airbag where an inner pressure of said first chamber is higher than that of said second chamber, the restriction member is overlaid on the vent hole by the tension applied to the restriction member via the tether member so as to maintain the vent hole substantially closed, and after the early stage of the inflation, as gas generation of the inflator is decreased or ended, the inner panel loosens and the tension becomes equal to or less than the predetermined value so as to open the vent hole.

3. An airbag device according to claim 1, wherein the airbag device is further arranged such that when the occupant in a vicinity of the airbag collides with the airbag in a state that said inner panel is loose before the first chamber is filled with the gas, the tension applied to said restriction member does not reach the predetermined value so that the vent hole is opened.

4. An airbag device according to claim 1, wherein said restriction member is disposed on an outer surface of the airbag so as to open the vent hole by separating from the vent hole.

5. An airbag device according to claim 1, wherein said tether member is connected to said inner panel.

6. An airbag device according to claim 1, further comprising another tether member for connecting a portion of the outer shell facing the inner panel and said inner panel, and said tether member being connected to a middle portion in a longitudinal direction of said another tether member.

7. An airbag device according to claim 1, wherein said restriction member has a sheet shape, and includes one end portion connected to said outer shell, and the other end portion located at a side opposite to the one end portion relative to said vent hole and connected to said tether member.

8. An airbag device according to claim 1, wherein the volume of said first chamber is in a range of from 30 to 45 liters.

9. An airbag device according to claim 1, wherein a diameter of the airbag when being inflated is in a range of from 630 to 700 mm, and a diameter of the first chamber when being inflated is in a range of from 550 to 600 mm.

10. An airbag apparatus comprising the airbag device according to claim 1 and an inflator for inflating said airbag.

11. An airbag device according to claim 1, wherein the restricting member has a bulging portion covering a hole in the outer shell, the bulging portion bulging outwardly from the outer shell to assume an essentially hemi-prolate spheroidal shape when filled with gas, and having the vent hole.

12. An airbag device according to claim 11, wherein the vent hole faces the through hole when the bulging portion bulges outwardly.

13. An airbag device to be deployed by gas supplied from an inflator for restraining an occupant, comprising:

an outer shell forming an airbag;
an inner panel for partitioning an inside of the airbag into a first chamber at a side opposite to the occupant and a second chamber at a side of the occupant, the inner panel having a peripheral edge connected to a side periphery of the airbag, and a communication portion for allowing communication between the first chamber and the second chamber;
a vent structure formed on the first chamber and having a bulging portion bulging outwards from the first chamber and a vent hole formed in the bulging portion; and
a tether member passing through a through hole formed in the airbag for connecting the bulging portion and the inner panel,
wherein said airbag device is arranged such that as the inflator starts its operation, the gas is first introduced into the first chamber and is then introduced into the second chamber through the communication portion,
when the first chamber is filled with the gas and the inner panel is tensioned, tension exceeding a predetermined value is applied to said bulging portion via the tether member so that said bulging portion is squash folded so as to maintain said vent portion in a, substantially closed state, and
when the first chamber is not filled with gas and the inner panel loosens, the tension applied to said bulging portion does not reach the predetermined value so that said bulging portion stands so as to open said vent portion.

14. An airbag device according to claim 13, wherein said airbag device is further arranged such that when said first chamber is filled with the gas and the tension exceeding said predetermined value is applied to said bulging portion, the bulging portion is squash folded so that the bulging portion is overlaid on an outer surface of the airbag near the bulging portion, and wherein said vent hole is formed in the bulging portion so as to be overlaid on the outer surface of the airbag.

15. An airbag device according to claim 13, further comprising another tether member for connecting a portion at the outer shell facing the inner panel and said inner panel, said tether member being connected to a middle portion in a longitudinal direction of said another tether member.

* * * * *